Feb. 24, 1948.  S. V. PERRY  2,436,666
ELECTRICAL CALCULATOR
Filed Feb. 22, 1944

Inventor
SYDNEY V. PERRY
By C. D. Puska
Attorney

Patented Feb. 24, 1948

2,436,666

UNITED STATES PATENT OFFICE 2,436,666

ELECTRICAL CALCULATOR

Sydney V. Perry, West Collingswood, N. J., assignor to Radio Corporation of America, a corporation of Delaware Application February 22, 1944, Serial No. 523,457

6 Claims. (Cl. 235—61)

My invention relates to electrical circuits for solving equations of certain types. It relates specifically to an electrical calculator for use in determining washer or spacer thicknesses in assembling variable capacitor units that require uniform spacing of capacitor elements for all units coming off an assembly line.

In my copending application Serial No. 471,003, filed January 1, 1943, and entitled Capacity modulator unit, I have described and claimed a variable capacitor unit and a method of calculating the thickness of the washers required at three supporting points for spacing a pair of capacitor plates the same distance in all units from a movable diaphragm. Such uniformity of spacing is important, for example, in the production of frequency-modulated radio altimeters which must be accurately calibrated. The method of calculating washer thickness involves making three capacity measurements when a test head plate is on the variable capacity unit, and then solving three equations. The solution of these equations in the usual manner is tedious and there is always the possibility of errors.

An object of the present invention is to provide an electrical calculator for solving the above-mentioned equations for determining the washer thicknesses that are required for the correct spacing at the support points of a variable capacitor unit.

A further object of the invention is to provide an improved method of and means for solving equations.

A still further object of the invention is to provide an improved electrical calculating circuit.

Figure 1:
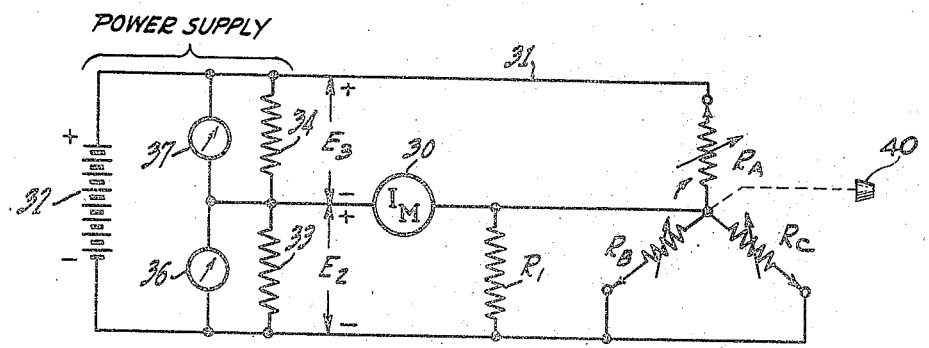
Figure 2:
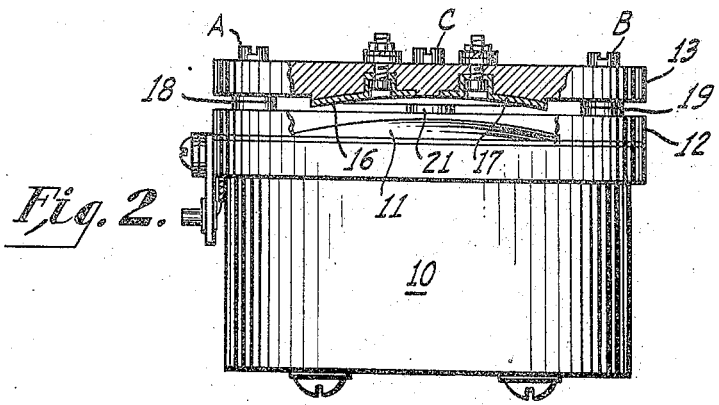
Figure 3:
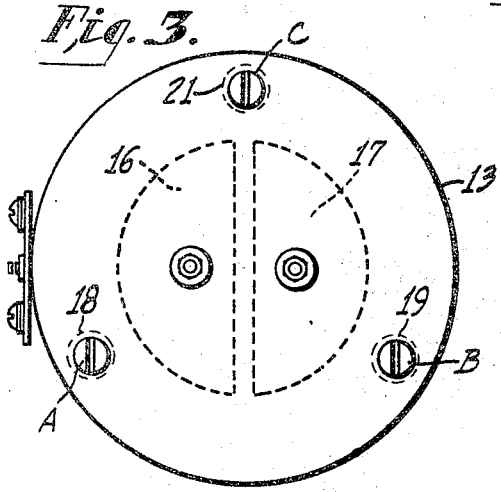
Figure 4:
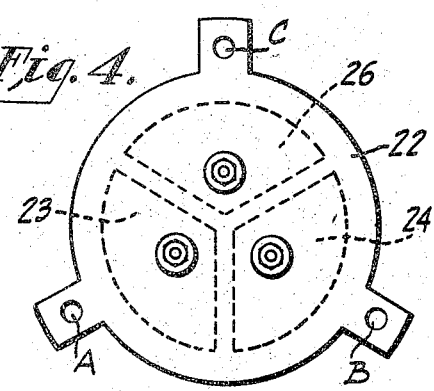

The invention will be described with reference to the accompanying drawing in which Figure 1 is a circuit diagram of one preferred embodiment of the invention, Figure 2 is a side view, partly in section, of a variable capacity unit having a capacity head that is supported at three points with spacing washers at one or more of these points, Figure 3 is a plan view of the unit shown in Fig. 2, and Figure 4 is a plan view of a test capacitor head used in making the capacity measurements required in calculating the washer thicknesses for the unit of Fig. 2.

Fig. 1 shows an electrical network designed for solving the following equations $$d_A = K_1 + \frac{K_2}{C_B} + \frac{K_2}{C_C} - \frac{K_3}{C_A} \quad (I)$$

$$d_B = K_1 + \frac{K_2}{C_C} + \frac{K_2}{C_A} - \frac{K_3}{C_B} \quad (II)$$

$$d_C = K_1 + \frac{K_2}{C_A} + \frac{K_2}{C_B} - \frac{K_3}{C_C} \quad (III)$$

in which $d_A$, $d_B$ and $d_C$ are washer or spacer thicknesses in mils, $K_1$, $K_2$ and $K_3$ are constants which are the same for all the variable capacitor units, and $C_A$, $C_B$ and $C_C$ are the three capacitance values measured on each individual capacitor unit by using the test head plate. The derivation of these equations is described in my above-identified copending application.

In order that this specific application of the invention may be clearly understood, reference will now be made to Figs. 2, 3 and 4. As shown in Fig. 2, the assembled capacitor unit comprises a supporting casing 10 to which a thin metal diaphragm 11 of spherical contour is clamped by means of a ring 12. The diaphragm 11 is vibrated in accordance with a modulating signal by means of a driving coil (not shown) which is located in a magnetic field.

A head plate 13, referred to as the production head plate, has two capacitor plates 16 and 17 coated on or otherwise attached to its under surface which is concave to conform to the contour of the diaphragm 11. The head plate 13 is supported on the ring 12 at the points A, B and C. The required spacings between the capacitor plates 16 and 17 on the head plate 13 and the diaphragm 11 are obtained by means of washers or spacers 18, 19 and 21, having the thicknesses $d_A$, $d_B$ and $d_C$, respectively.

Fig. 4 shows the test head plate 22 which has three capacitor plates 23, 24 and 26 on its under surface in place of the two plates 16 and 17. The test head plate replaces the production head plate 13 when making the three capacity measurements. It is set on the ring 12 without washers and is supported at the same points A, B and C as the production head plate. The capacities $C_A$, $C_B$ and $C_C$ between the diaphragm 11 and the plates 23, 24 and 26, respectively, are then measured. Since the constants $K_1$, $K_2$ and $K_3$ are known, the equations I, II and III may now be solved for $d_A$, $d_B$ and $d_C$.

Referring again to Fig. 1, the electrical network comprises a power supply indicated by the legend and an ammeter 30 having one terminal connected to an intermediate point on the power supply. The other terminal of the meter 30 is connected to the lower power supply terminal through an impedance unit $R_1$ and through variable impedance units $R_B$ and $R_C$ in parallel with $R_1$. The said other terminal of the meter 30 is connected to the upper end of the power supply through a third variable impedance unit $R_A$ and through a conductor 31. The power supply may be either alternating current or direct current and the impedance units may be resistive, inductive or capacitive. The reference characters $R_1$, $R_A$, $R_B$ and $R_C$ identifying the several impedance units also represent their impedance values.

In the example illustrated, the power supply comprises a battery 32 and voltage dividing resistors 33 and 34 which have voltmeters 36 and 37, respectively, connected thereacross. The voltages across the resistors 33 and 34 are $E_2$ and $E_3$, respectively. The impedance units $R_1$, $R_A$, $R_B$ and $R_C$ are resistors. If the circuit values are correctly selected, the current $I_M$ through the meter 30 equals the washer thickness to be determined. This will be apparent from the following considerations:

$$I_M = \frac{E_2}{R_1} + \frac{E_2}{R_B} + \frac{E_2}{R_C} - \frac{E_3}{R_A}$$

where the resistors $R_A$, $R_B$ and $R_C$ are switched into the circuit as illustrated. It will be seen that this equation is in the same form as the Equations I, II and III for washer thickness and that if $E_2$ be made numerically equal to $K_2$ of Equation I, $E_3$ be made numerically equal to $K_3$ of Equation I, $R_1$ be made numerically equal to $$\frac{E_2}{K_1} \text{ or } \frac{K_2}{K_1}$$

of Equation I, and if $R_A$, $R_B$ and $R_C$ be made numerically equal to the measured capacities $C_A$, $C_B$ and $C_C$, respectively, then $I_M$ will be numerically equal to $d_A$ and Equation I will be solved.

The Equations II and III are solved in the same way for $d_B$ and $d_C$, respectively, by properly interchanging the resistors $R_A$, $R_B$ and $R_C$. This is readily accomplished by a suitable switch. Thus if the resistor assembly $R_A$, $R_B$ and $R_C$ is rotated clockwise 120 degrees by means of a knob 40 in accordance with the schematic diagram (Fig. 1), the meter reading $I_M$ gives the washer thickness $d_B$. In a similar manner the required thickness $d_C$ is obtained by rotating the resistors $R_A$, $R_B$ and $R_C$ an additional 120 degrees. Thus the washer spacings at the three support points of each variable capacitor unit are quickly and accurately determined.

It will be apparent that by making the voltages $E_1$ and $E_2$ independently adjustable, any one of the eight elements of Equations I, II and III may be evaluated if the other seven are known. Equations of the same general type but having more (or less) terms may likewise be solved by adding or omitting suitable resistors.

I claim as my invention:

1. An electrical calculating circuit comprising a voltage source having a voltage $E_3$ representing a constant $K_3$, a variable impedance unit having an impedance $R_A$ representing a capacity that has been measured, an ammeter having one terminal connected to one terminal of said voltage source, said ammeter having its other terminal connected to the other terminal of said voltage source through said variable impedance unit, a second voltage source having a voltage $E_2$ representing a constant $K_2$, said one ammeter terminal being connected to one terminal of said second voltage source and to a fixed junction point of said two voltage sources, a second variable impedance unit having an impedance $R_B$ representing a second capacity that has been measured, said other ammeter terminal being connected through said second variable impedance unit to the other terminal of the second voltage source, said two voltage sources being connected to said ammeter in voltage opposition, whereby the current $I_M$ through said ammeter is given by the equation $$I_M = \frac{E_2}{R_B} - \frac{E_3}{R_A}$$

and switching means for interchanging the positions of said variable impedance units in the circuit whereby the current through the ammeter is then determined by the equation $$I'_M = \frac{E_2}{R_A} - \frac{E_3}{R_B}$$

and whereby the values $I_M$ and $I'_M$ are the solution to the two simultaneous equations.

2. An electrical calculating circuit comprising a voltage source having a voltage $E_3$ representing a constant $K_3$, a variable impedance unit having an impedance $R_A$ representing one variable of an equation, an ammeter having one terminal connected to one terminal of said voltage source, said ammeter having its other terminal connected to the other terminal of said voltage source through said variable impedance unit, a second voltage source having a voltage $E_2$ representing a constant $K_2$, said one ammeter terminal being connected to one terminal of said second voltage source and to a fixed junction point of said two voltage sources, two additional variable impedance units having impedances $R_B$ and $R_C$, respectively, representing two other variables of said equation, said other ammeter terminal being connected through said additional variable impedance units to the other terminal of the second voltage source with said additional units in parallel with each other, said two voltage sources being connected to said ammeter in voltage opposition, whereby the current $I_M$ through said ammeter is given by the equation $$I_M = \frac{E_2}{R_B} + \frac{E_2}{R_C} - \frac{E_3}{R_A}$$

and switching means for interchanging the positions of said three variable impedance units in the circuit whereby three ammeter readings are obtained which are the solution to three simultaneous equations.

3. An electrical calculating circuit comprising a voltage source having a voltage $E_3$ representing a constant $K_3$, a variable impedance unit having an impedance $R_A$ representing one variable of an equation, an ammeter having one terminal connected to one terminal of said voltage source, said ammeter having its other terminal connected to the other terminal of said voltage source through said variable impedance unit, a second voltage source having a voltage $E_2$ representing a constant $K_2$, said one ammeter terminal being connected to one terminal of said second voltage source and to a fixed junction point of said two voltage sources, a fixed impedance unit having an impedance $R_1$ and two additional variable impedance units having impedances $R_B$ and $R_C$, respectively, representing two other variables of said equation, said other ammeter terminal being connected through said fixed impedance unit and said additional variable impedance units to the other terminal of the second voltage source with said fixed impedance unit and said additional units in parallel with each other, said two voltage sources being connected to said ammeter in voltage opposition whereby the current $I_M$ through said ammeter is given by the equation $$I_M = \frac{E_2}{R_1} + \frac{E_2}{R_B} + \frac{E_2}{R_C} - \frac{E_3}{R_A}$$

and switching means for interchanging the positions of said three variable impedance units in the circuit whereby three ammeter readings are obtained which are the solution to three simultaneous equations.

4. An electrical calculating circuit comprising a power supply having two output terminals and a terminal intermediate said two terminals, said output terminals being at fixed voltages $E_2$ and $E_3$, respectively, with reference to said intermediate terminal, an ammeter having one terminal connected to said intermediate terminal of the power supply, said ammeter having its other terminal connected to the $E_3$ volt output terminal through a variable impedance unit having an impedance $R_A$ representing a variable of an equation and connected to the $E_2$ volt output terminal through a fixed impedance unit having an impedance $R_1$ and two variable impedance units having impedances $R_B$ and $R_C$, respectively, representing two variables of said equation, said last three units being in parallel with each other whereby the current $I_M$ through said ammeter is given by the equation $$I_M = \frac{E_2}{R_1} + \frac{E_2}{R_B} + \frac{E_2}{R_C} - \frac{E_3}{R_A}$$

and means for interchanging said impedance values $R_A$, $R_B$ and $R_C$ in the circuit whereby three ammeter readings are obtained which are the solution to three simultaneous equations.

5. An electrical calculating circuit comprising a power supply having two output terminals and a terminal intermediate said two terminals, said output terminals being at voltages $E_2$ and $E_3$, respectively, with reference to said intermediate terminal, said voltages $E_2$ and $E_3$ representing constants $K_2$ and $K_3$, respectively, of an equation, an ammeter having one terminal connected to said intermediate terminal of the power supply, said ammeter having its other terminal connected to the $E_3$ volt output terminal through a variable impedance unit having an impedance $R_A$ representing a variable of said equation and connected to the $E_2$ volt output terminal through a fixed impedance unit having an impedance $R_1$ and two variable impedance units having impedances $R_B$ and $R_C$, respectively, representing two variables of said equation, said last three units being in parallel with each other whereby the current $I_M$ through said ammeter is given by the equation $$I_M = \frac{E_2}{R_1} + \frac{E_2}{R_B} + \frac{E_2}{R_C} - \frac{E_3}{R_A}$$

and switching means for interchanging the positions of said three variable impedance units in the circuit whereby three ammeter readings are obtained which are the solution to three simultaneous equations.

6. An electrical calculating circuit comprising a power supply having two output terminals and a terminal intermediate said two terminals, said output terminals being at voltages $E_2$ and $E_3$, respectively, with reference to said intermediate terminal, said voltages $E_2$ and $E_3$ representing constants $K_2$ and $K_3$, respectively, of an equation, an ammeter having one terminal connected to said intermediate terminal of the power supply, said ammeter having its other terminal connected to the $E_3$ volt output terminal through a variable impedance unit having an impedance $R_A$ representing a variable of said equation and connected to the $E_2$ volt output terminal through a fixed impedance unit having an impedance $R_1$ and two variable impedance units having impedances $R_B$ and $R_C$, respectively, representing two variables of said equation, said last three units being in parallel with each other whereby the current $I_M$ through said ammeter is given by the equation $$I_M = \frac{E_2}{R_1} + \frac{E_2}{R_B} + \frac{E_2}{R_C} - \frac{E_3}{R_A}$$

said three variable impedance units being rotatable as a unit for interchanging their positions in the circuit whereby three ammeter readings are obtained which are the solution to three simultaneous equations.

SYDNEY V. PERRY.

REFERENCES CITED

The following references are of record in the file of this patent:

UNITED STATES PATENTS

| Number | Name | Date |
|---|---|---|
| 2,087,667 | Hedin | July 20, 1937 |

OTHER REFERENCES

Arthur Wright, Electrical Device for Evaluating Formulae and Solving Equations. The London, Edinburgh and Dublin Philosophical Mag., vol. XVIII, 6th series (1909). Pages 291–308.